(12) United States Patent
Pham Van et al.

(10) Patent No.: US 12,096,506 B2
(45) Date of Patent: Sep. 17, 2024

(54) NAS-AS INTERACTION FOR EARLY DATA TRANSMISSION

(71) Applicant: TELEFONAKTIEBOLAGET LM ERICSSON (PUBL), Stockholm (SE)

(72) Inventors: Dung Pham Van, Upplands Väsby (SE); Magnus Stattin, Upplands Väsby (SE); Mikael Wass, Sätila (SE); Emre Yavuz, Stockholm (SE); Tuomas Tirronen, Helsinki (FI); Ivo Sedlacek, Hovorcovice (CZ)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 306 days.

(21) Appl. No.: 17/423,657

(22) PCT Filed: Jan. 17, 2020

(86) PCT No.: PCT/IB2020/050386
§ 371 (c)(1),
(2) Date: Jul. 16, 2021

(87) PCT Pub. No.: WO2020/148727
PCT Pub. Date: Jul. 23, 2020

(65) Prior Publication Data
US 2022/0124864 A1 Apr. 21, 2022

Related U.S. Application Data

(60) Provisional application No. 62/793,435, filed on Jan. 17, 2019.

(51) Int. Cl.
*H04W 76/27* (2018.01)

(52) U.S. Cl.
CPC ............................ *H04W 76/27* (2018.02)

(58) Field of Classification Search
CPC ............................ H04W 76/27; H04L 12/50
USPC ............................ 370/329, 401, 402, 403
See application file for complete search history.

(56) References Cited

U.S. PATENT DOCUMENTS 11,758,587 B2 * 9/2023 Jeon ................. H04W 72/23
370/329

OTHER PUBLICATIONS

Huawei, et al., AS-NAS interactions for EDT for eMTC and Nb-IoT, R2-1802216, 3GPP TSG-RAN WG2 Meeting #101, Athens, Greece, Feb. 26-Mar. 2, 2018.
LG Electronics Inc., MO CP EDT when RRC connection is suspended, R2-1806085, 3GPP TSG-RAN WG2 Meeting #101bis, Sanya, China, Apr. 16-20, 2018.
(Continued)

*Primary Examiner* — Dang T Ton
(74) *Attorney, Agent, or Firm* — Weisberg I.P. Law, P.A.

(57) ABSTRACT

According to some embodiments, a method performed by a wireless device comprises: obtaining, from a non-access stratum (NAS) communication layer, an initial NAS protocol data unit (PDU) for potential early data transmission; determining, by an access-stratum (AS) communication layer, whether the initial NAS PDU is intended to be delivered when an associated radio resource control (RRC) connection is resumed successfully; and upon determining that the initial NAS PDU is not intended to be delivered when the associated RRC connection is resumed successfully, transmitting an early data transmission including the initial NAS PDU.

20 Claims, 12 Drawing Sheets

(56) References Cited

OTHER PUBLICATIONS

3rd Generation Partnership Project; Technical Specification Group Services and System Aspects; Study on Cellular Internet of Things (IoT) support and evolution for the 5G System (Release 16) 3GPP TR 23.724 V16.0.0, Dec. 2018.

Ericsson, EDT-CP-CPSR provided at time of RRC connection establishment, C1-190065, 3GPP TSG-CT WG1 Meeting #114, Bratislava, Slovakia, Jan. 21-25, 2019.

3rd Generation Partnership Project; Technical Specification Group Core Network and Terminals; Non-Access-Stratum (NAS) protocol for Evolved Packet System (EPS); Stage 3 (Release 15) 3GPP TS 24.301 V15.2.0, Mar. 2018.

3rd Generation Partnership Project; Technical Specification Group Radio Access Network; Evolved Universal Terrestrial Radio Access (E-UTRA); Radio Resource Control (RRC); Protocol specification (Release 15) 3GPP TS 36.331 V15.3.0, Sep. 2018.

3rd Generation Partnership Project; Technical Specification Group Radio Access Network; Evolved Universal Terrestrial Radio Access Network (E-UTRAN); S1 Application Protocol (S1AP) (Release 15) 3GPP TS 36.413 V15.3.0, Sep. 2018.

* cited by examiner

NAS-AS INTERACTION FOR EARLY DATA TRANSMISSION

This application is a 371 of International Application No. PCT/162020/050386, filed Jan. 17, 2020, which claims the benefit of U.S. Application No. 62/793,435, filed Jan. 17, 2019, the disclosures of which are fully incorporated herein by reference.

TECHNICAL FIELD

Particular embodiments relate to wireless communication, and more specifically to non-access stratum (NAS) signaling when cellular Internet-of-things (CIoT) evolved packet system (EPS) user plane (UP) optimization is used without early data transmission (EDT).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Recent Third Generation Partnership Project (3GPP) activity includes technologies for Machine-to-Machine (M2M) and/or Internet of Things (IoT) use cases, such as enhancements to support Machine-Type Communications (MTC) with new user equipment (UE) categories (e.g., Cat-M1, Cat-M2), supporting reduced bandwidth of up to 6 and 24 physical resource blocks (PRBs), and narrowband IoT (NB-IoT) UEs providing a new radio interface (and UE categories Cat-NB1 and Cat-NB2), as well as cellular IoT evolved packet systems (CIoT EPS) optimizations for reduced signaling in support of small and infrequent data transmissions.

The LTE enhancements introduced in 3GPP Release 13, 14, 15, and 16 for MTC are referred to herein as eMTC, including (not limiting) support for bandwidth limited UEs, Cat-M1, and support for coverage enhancements. This is to contrast NB-IoT (notation used herein for any 3GPP Release), although the features are similar on a general level.

Both eMTC and NB-IoT include CIoT EPS UP optimization and CIoT EPS control plane (CP) optimization signaling reductions. The former, referred to herein as UP solution, enables a UE to resume a previously stored radio resource control (RRC) connection (thus also known as RRC Suspend/Resume). The latter, referred to herein as CP solution, enables the transmission of user-plane data over NAS (DoNAS). In the CP solution, transport of user data via control plane is accomplished by encapsulating them in NAS protocol data units (PDUs) and using the NAS transport capabilities of RRC and S1-AP protocols and the data transport of GTP-u tunnels between mobility management entity (MME) and serving gateway (S-GW) and between S-GW and packet data network gateway (P-GW). This reduces the total number of control plane messages when handling a short data transaction without, for example, activating access stratum (AS) security functions.

To facilitate the description of particular embodiments, the messages in the random access (RA) procedure are commonly referred to as message 1 (Msg1) through message 4 (Msg4). From 3GPP TS36.300, the contention-based RA procedure is illustrated in FIG. 1.

FIG. 1 is a flow diagram illustrating an example random access procedure. In message 1, the UE sends a random access preamble to the eNB/gNB. In message 2, the eNB/gNB responds with a random access response message. The UE sends a scheduled transmission using message 3. The eNB/gNB performs contention resolution with message 4.

3GPP TS24.301 and TS36.331 describes the NAS-AS interaction regarding the CIoT EPS optimizations procedures according to the following steps. To establish an NAS signaling connection when the UE is in EMM-IDLE mode, a procedure using an initial NAS message is initiated at UE NAS layer. For the CP solution, the initial NAS message may contain user data, such as a control plane service request (CPSR).

Upon trigger of the procedure, the NAS requests lower layers (e.g., RRC) to establish or resume an RRC connection. The NAS also provides lower layers with relevant parameters (e.g., serving temporary mobile subscriber identity (S-TMSI), selected public land mobile network (PLMN), establishment cause, call type).

Upon request from upper layers, the UE RRC layer establishes/resumes an RRC connection, during which the RRC builds an RRCConnectionRequest/RRCConnectionResumeRequest with parameters provided by upper layers to submit to lower layers (e.g., media access control (MAC)) to transmit in Msg3.

Upon reception of an RRC message in Msg4 in response to the RRCConnectionRequest/RRCConnectionResumeRequest in Msg3, the RRC layer considers the RRC connection successfully established/resumed and indicates it to upper layers (e.g., NAS) accordingly.

Upon indication from lower layers that the RRC connection has been established/resumed, the NAS considers the NAS signaling connection established between UE and MME. The NAS then considers whether to send (submit to lower layers) the pending initial NAS message.

In some cases, the NAS PDU is not provided to AS layer for being delivered to the MME. In other cases, the pending NAS PDU is provided to AS layer. For example, 3GPP TS24.301, Section 5.3.1.3 provides the following. If the pending NAS message is: (a) a SERVICE REQUEST message; (b) a CONTROL PLANE SERVICE REQUEST message, and the UE did not include any ESM message container, NAS message container or EPS bearer context status information elements; or (c) an EXTENDED SERVICE REQUEST message, and the service type information element indicates "packet services via S1" and the UE did not include any EPS bearer context status information element, then the message shall not be sent. Otherwise the UE shall cipher the message as specified in subclause 4.4.5 and send the pending initial NAS message upon entering EMM-CONNECTED mode.

Finally, the RRC layer submits the RRCConnection(Resume)Complete to lower layers to be sent in Msg5 for completion of connection establishment/resumption. If the initial NAS PDU is provided by NAS, it is included in this RRC message.

3GPP Rel-15 includes an early data transmission (EDT) feature for mobile-originated (MO) calls for UP (i.e., UP-EDT) and CP (i.e., CP-EDT) solutions for both eMTC and NB-IoT UEs. MO-EDT is triggered by AS layer in the UE when upper layers have requested the establishment or resumption of RRC connection for MO-data and the data to be transmitted in the uplink is small enough, e.g., with respect to the information provided in system information broadcast.

The UE indicates its intention of using EDT, i.e., sending uplink user data in Msg3, by selecting an EDT preamble in Msg1. The eNB provides the UE with an EDT uplink grant in Msg2 that permits the UE to transmit uplink data with the relevant signaling in Msg3. Depending on the size of the data to be transmitted in the uplink, the UE can select a suitable (possible smallest) value of transport block size (TBS) among the possible values specified based on the maximum TBS value and the permitted number of blind decodes (i.e., number of TBS values smaller than the maximum value) provided by the eNB via system information broadcast.

Downlink data (if any) can be included in Msg4 together with signaling that indicates the UE to return to RRC_IDLE mode to save power if no more data transmission is expected. But if there is more user data to be transmitted, the network can, in Msg4, indicate the UE to move to RRC_CONNECTED mode, i.e., establishing or resuming the RRC connection as in legacy for further data transmissions.

Another 3GPP objective for both LTE-M and NB-IoT is to support EDT for mobile-terminated (MT) calls (MT-EDT), i.e., to enable early transmission of small downlink data to a UE. This improves downlink transmission efficiency and/or UE power consumption. MT-initiated EDT may be supported for both CP and UP solutions.

MT-EDT is for user data, i.e. not for NAS signaling. MT-EDT are evaluated, for example, based on battery life, network resource efficiency, security, reliability and potential impact on core network. MT-EDT is intended for downlink data that can be transmitted in one transport block. Use cases that require downlink data transmission with or without uplink data transmission as a response may be supported for MT-EDT.

There currently exist certain challenges. For example, in the existing EDT mechanism described in the steps above, there is a problem when a UE in EMM-IDLE mode with suspended indication initiates a (extended/control plane) service request procedure and the corresponding initial NAS message needs to be delivered to the network when the RRC connection is considered successfully resumed. An example of such initial NAS message is the Extended Service Request (ESR) with EPS bearer context status information element(s) used to indicate to the MME the local release of EPS bearer(s) at the UE. Another example is the ESR for SMS over NAS.

Because the UE AS layer cannot distinguish an EDT procedure from other connection establishment/resumption procedures based only on call type of "originating calls" and RRC establishment cause of "MO data", if the conditions for initiating EDT is fulfilled, the AS layer may trigger UP-EDT to send user data in Msg3. As a result, the pending initial NAS message is not delivered to the MME if the UP-EDT is completed with a release command in Msg4. In case UP-EDT falls back, i.e., Msg4 is with an RRCConnection-Resume, the eNB receives the corresponding uplink NAS-PDU from UE in Msg5 (RRCConnectionResumeComplete) and then forwards this to the MME via S1AP. This means the MME receives the initial NAS message after user data has been delivered to the network and when the S1_MME connection has already been established, i.e., MME already considers UE in EMM-CONNECTED. That is, irrespective of successful UP-EDT, this is not expected because UP-EDT hinders/disallows exchange of NAS signaling between UE and MME. The above observations may apply to Rel-16 MT-EDT, e.g., if ESR/CPRS is triggered at UE NAS in response to a MT-EDT paging when in EMM-IDLE with suspend indication.

For Rel-13 UP CIoT EPS optimizations, the MME may receive an initial uplink NAS message when in EMM-CONNECTED for the considered scenarios. This is because the eNB is currently not able to forward the initial NAS PDU in the same S1AP UE context resume request message. Therefore, it is desired to have solutions for both Rel-15 and Rel-16 EDT as well as Rel-13 UP CIoT EPS optimizations.

Another NAS-AS interaction problem occurs when both CP and UP CIoT EPS optimizations are used in parallel. A UE in EMM-IDLE with suspend indication initiates the CPSR for transport of data over the control plane. To perform EDT, the initial NAS PDU with user data needs to be provided to the AS layer early, e.g., together with the request to resume the RRC connection. However, the AS layer cannot initiate CP-EDT because the upper layers request resumption rather than establishment of an RRC connection. The AS layer may not initiate UP-EDT in this case because the Rel-15 UP-EDT currently does not allow multiplexing a NAS-PDU in Msg3. Moreover, the UE is requested to resume a RRC connection, and thus not able to send a NAS-PDU with data in a RRC message different from RRCConnectionResumeRequest, e.g., RRCEarlyDataRequest. It may be more beneficial for the UE to perform EDT, if other conditions are fulfilled, in this case.

SUMMARY

As described above, certain challenges currently exist with interactions between the non-access stratum (NAS) and access stratum (AS) when using early data transmission (EDT). Certain aspects of the present disclosure and their embodiments may provide solutions to these or other challenges.

For example, particular embodiments include enhanced interaction between NAS and AS layers to ensure that exchange of NAS signaling between a user equipment (UE) and a mobility management entity (MME) is not hindered/disallowed by the use of cellular Internet-of-things (CIoT) evolved packet system (EPS) user plane (UP) optimization with or without early data transmission during random access procedure. Some embodiments facilitate the UE and network to deliver (critical) NAS signaling prior to user data delivery when UP-EDT/UP CIoT EPS optimizations are used. Some embodiments enable EDT when both CP and UP CIoT EPS optimizations are used in parallel. Although some embodiments are described with respect to LTE and NB-IoT, the embodiments also apply to fifth generation (5G) new radio (NR).

Some embodiments include a method to prioritize/allow for delivery of (critical) NAS signaling when UP-EDT is initiated by the AS layer or UP CIoT EPS optimization is used. MME behavior is updated to allow for the reception of initial NAS message when in an EMM-CONNECTED state. For Rel-13 UP CIoT EPS optimization, in some embodiments the S1AP UE context resume request is extended to include the initial NAS-PDU. For UP-EDT (both mobile originated (MO) and mobile terminated (MT)), in some embodiments the UE may decide not to perform EDT to avoid hindering delivery of NAS signaling. Alternatively, the UE can decide to send the pending NAS PDU together with user data in random access Message 3.

Some embodiments include a method to enable a UE to perform EDT when both CP and UP CIoT EPS optimizations are used in parallel. In particular embodiments, the UE AS layer decides to not resume the suspended radio resource control (RRC) connection and instead performs CP-EDT with pending control plane service request (CPSR) protocol data unit (PDU). In particular embodiments, the UE AS layer determines to not perform UP-EDT, even if all conditions for initiation are fulfilled, so that the initial uplink CPRS PDU is delivered in RRCConnectionResumeComplete in Message 5. In particular embodiments, the UE AS layer determines to continue the resumption procedure and send the CPRS PDU in Message 3 (i.e., media access control (MAC) multiplexing with RRCConnectionResumeRequest). The eNB behavior is updated to pass the CPRS PDU to the MME.

According to some embodiments, a method performed by a wireless device comprises: obtaining, from a NAS communication layer, an initial NAS PDU for potential early data transmission; determining, by an AS communication layer, whether the initial NAS PDU is intended to be delivered when an associated RRC connection is resumed successfully; and upon determining that the initial NAS PDU is not intended to be delivered when the associated RRC connection is resumed successfully, transmitting an early data transmission including the initial NAS PDU.

In particular embodiments, the method further comprises, upon determining that the initial NAS PDU is intended to be delivered when the associated RRC connection is resumed successfully, not transmitting the initial NAS PDU in an early data transmission.

In particular embodiments, determining whether the initial NAS PDU is intended to be delivered when the associated RRC connection is resumed successfully comprises obtaining an indication from the NAS communication layer whether the initial NAS PDU is intended to be delivered when the associated RRC connection is resumed successfully and making the determination based on the obtained indication. Obtaining the indication may comprise the AS communication layer requesting the indication from the NAS communication layer or the NAS communication layer sending the indication to the AS communication layer.

In particular embodiments, the method further comprises, upon determining that the initial NAS PDU is intended to be delivered when the associated RRC connection is resumed successfully, transmitting the initial NAS PDU in an early data transmission by multiplexing the initial NAS PDU, user data, and RRC signaling.

According to some embodiments, a method performed by a wireless device comprises: obtaining, from a NAS communication layer, a connection resume request and an initial NAS PDU for potential early data transmission; determining, by an AS communication layer, whether the initial NAS PDU includes user data to be transmitted using a CPSR; and upon determining that the initial NAS PDU includes user data to be transmitted using a CPSR, transmitting an early data transmission including the initial NAS PDU instead of a connection resume.

In particular embodiments, the method further comprises, upon determining that the initial NAS PDU does not include user data to be transmitted using a CPSR, performing the connection resume.

In particular embodiments, determining whether the initial NAS PDU includes user data to be transmitted using a CPSR comprises obtaining an indication from the NAS communication layer whether the initial NAS PDU includes user data to be transmitted using a CPSR and making the determination based on the obtained indication. Obtaining the indication may comprise the AS communication layer requesting the indication from the NAS communication layer or the NAS communication layer sending the indication to the AS communication layer.

In particular embodiments, the method further comprises, upon determining that the initial NAS PDU includes user data to be transmitted using a CPSR, transmitting the initial NAS PDU in an early data transmission multiplexed with a connection resume request.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

Certain embodiments may provide one or more of the following technical advantages. For example, particular embodiments facilitate performing a high-priority NAS signaling procedure together with EDT in the same RRC connection resumption, while enabling EDT to be performed when CP and UP CIoT EPS optimizations are used in parallel. Furthermore, particular embodiments provide backward compatibility.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
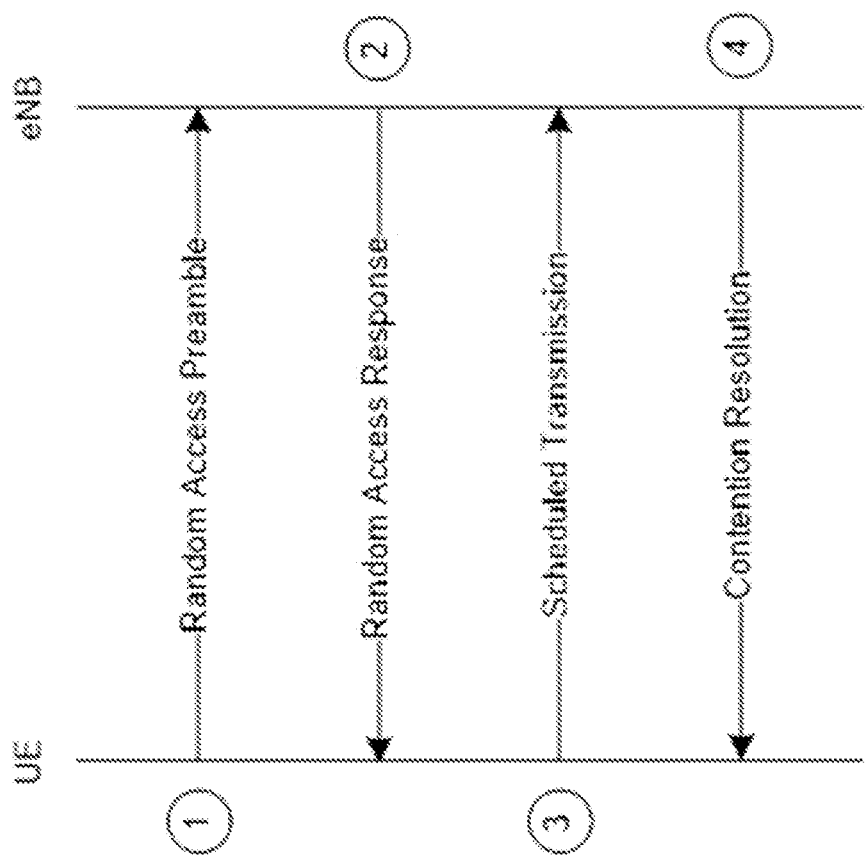
FIG. 1 (described above) is a flow diagram illustrating an example random access procedure.

As described above, certain challenges currently exist with interactions between the non-access stratum (NAS) and access stratum (AS) when using early data transmission (EDT). Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A first group of embodiments includes delivery of an initial NAS message and user plane (UP) user data. In some embodiments, when a mobility management entity (MME) receives an initial NAS message from a user equipment (UE) when the EMM state of the UE is already EMM-CONNECTED, the MME processes the message as normal rather than considering it an abnormal case and discarding the NAS protocol data unit (PDU).

Some embodiments facilitate (prioritize) delivery of an initial NAS message with a call type of "originating calls" and establishment cause of "MO data" together with (over) UP user data as follows. Currently, if a resume procedure (or UP-EDT) is completed, the initial NAS-PDU can only be forwarded to the MME after the S1AP UE CONTEXT RESUME procedure using the UPLINK NAS TRANSPORT procedure. In some embodiments, S1AP UE CONTEXT RESUME REQUEST is extended to include the initial NAS-PDU. The eNB, upon receipt of the RRCConnectionResumeComplete in Message 5 with the NAS-PDU, can forward it to the MME in the same S1AP message used to request the MME to resume UE context, UE-associated logical S1-connection and related bearer contexts in the evolved packet core (EPC). This applies to both UP-EDT (mobile originated (MO) and mobile terminated (MT)) and UP cellular Internet-of-things (CIoT) evolved packet system (EPS) optimization.

The following embodiments are for when Rel-15 MO UP-EDT is initiated. In some embodiments, when the eNB instructs the UE to continue with connection resume in Message 4 (i.e., UP-EDT fallback to legacy resume), the eNB postpones the S1AP procedure to avoid hindering delivery of possible NAS signaling. In particular, the eNB does not initiate the S1AP UE CONTEXT RESUME procedure upon receipt of Message 3. Instead, this is done upon receipt of Message 5. If the eNB receives an uplink NAS-PDU in Message 5, the eNB forwards it to the MME in the extended S1AP UE CONTEXT RESUME procedure, as described above.

In some embodiments, the UE determines not to perform EDT to avoid hindering delivery of NAS signaling. In particular embodiments, the NAS and AS interact to indicate/differentiate this type of NAS message before initiating EDT. For example, the AS layer when evaluating conditions for initiating EDT (described in TS36.331, section 5.3.3.1b), inquires/requests upper layers (NAS) whether the resume request is associated with an initial NAS message that needs to be unconditionally delivered upon having a NAS signaling connection.

The AS layer may initiate UP-EDT if informed by the NAS layer that the initial NAS message is not intended to be delivered upon RRC connection resumption. Or the AS layer may not initiate UP-EDT if informed by NAS layer that the initial NAS message needs to be delivered upon RRC connection resumption.

Alternatively, the NAS layer when requesting lower layers to resume an RRC connection may provide an additional indication that the pending initial NAS message is to be delivered if the connection is successfully resumed. The AS layer may only initiate UP-EDT if the upper layers do not provide the indication that the pending initial NAS message associated with the resume request is intended to be delivered if the RRC connection is resumed successfully. Or the AS layer shall not initiate UP-EDT if the upper layers provide the indication that the pending initial NAS message associated with the resume request is intended to be delivered if the RRC connection is resumed successfully.

In particular embodiments, the NAS layer when requesting lower layers to resume an RRC connection can provide an additional indication that the pending initial NAS message is not intended to be delivered if the connection is successfully resumed. The AS layer may only initiate UP-EDT if the upper layers provide the indication that the pending initial NAS message associated with the resume request is not intended to be delivered if the RRC connection is resumed successfully. Or the AS layer may not initiate UP-EDT if the upper layers do not provide the indication that the pending initial NAS message associated with the resume request is not intended to be delivered if the RRC connection is resumed successfully.

In some embodiments, the UE determines to send the initial NAS message together with user data in Message 3. First, the NAS layer provides the pending NAS-PDU to the AS layer early, e.g., upon request to resume the RRC connection. The NAS layer makes such a decision if the NAS message needs to be delivered upon connection resumption.

Figure 2:
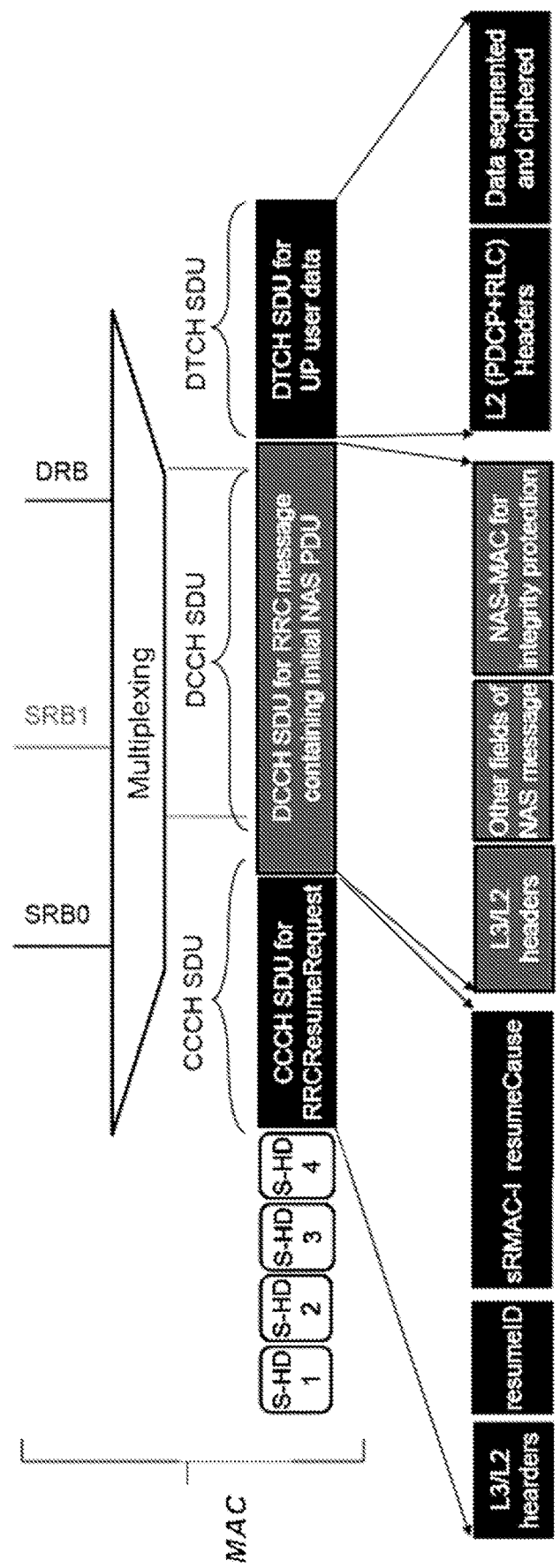
FIG. 2 is a block diagram illustrating and example of random access Message 3 content when an initial NAS PDU is transmitted together with UP-EDT data, according to a particular embodiment.

Second, the UP-EDT is modified to multiplex a NAS-PDU together with user data and existing RRC signaling, i.e., RRCConnectionResumeRequest. The NAS-PDU can be sent over SRB1/SRB1bis or SRB2 given that the RRCConnectionResumeRequest is over SRB0. In LTE-M, particular embodiments define a signaling radio bearer similar to SRB1bis in NB-IoT for the initial NAS message to reduce L2 overhead due to AS security function at the packet data convergence protocol (PDCP) layer. FIG. 2 illustrates an example of the content of Msg3 with NAS-PDU on SRB1.

The following embodiments are for when Rel-15 MO UP-EDT is initiated. When Rel-16 MT UP-EDT is initiated when a UE is in EMM-IDLE with suspend indication, if the downlink data is sent in Message 4 multiplexed in MAC with RRC signaling, then Message 3 has only RRC signaling. All the above embodiments are applicable except that there is no dedicated traffic channel (DTCH) service data unit (SDU) in the Message 3 content in FIG. 2.

A second group of embodiments includes enabling EDT when both CP and UP CIoT EPS optimizations are used in parallel. For example, if a UE capable of both UP-EDT and CP-EDT initiates the CPSR for transport of data over the control plane when in EMM-IDLE with suspend indication, the following embodiments apply.

In some embodiments, to prioritize CP-EDT over UP CIoT EPS optimization, upon receiving the resume request from upper layers, the UE AS layer does not resume the suspended RRC connection. Instead, if all conditions for EDT initiation are fulfilled and the NAS-PDU (CPSR) is made available at the AS, it initiates CP-EDT to deliver the pending CPSR PDU in RRCEarlyDataRequest in Message 3. In this embodiment, the UE trades the EDT benefit with the discarding of UE AS context. The UE is no longer able to use its suspended connection.

In particular embodiments, the NAS provides an additional indication to indicate that the pending initial NAS-PDU is with actual uplink user data (i.e., intended to be transported via control plane using CPSR procedure) when requesting the AS layer to resume the connection (or upon being requested by AS layer).

In particular embodiments, at the AS layer the conditions for initiating EDT in 3GPP TS36.331 are updated to allow for initiation of CP-EDT also when the upper layers request resumption of an RRC connection with an indication that the pending NAS-PDU is intended for transport of user data via control plane.

In some embodiments, to prioritize preservation of UE AS context for UP CIoT EPS optimization over CP-EDT and/or to avoid unexpected initial NAS message after connection resumption, upon receipt of the resume request from upper layers, the UE AS layer does not perform EDT (neither CP-EDT nor UP-EDT) even if conditions for EDT initiation are fulfilled. The legacy resume procedure is performed and the initial uplink CPRS PDU is delivered in RRCConnectionResumeComplete in Message 5. In this embodiment, the UE does not benefit from EDT, but legacy Rel-13 CP CIoT EPS optimization is used instead.

In some embodiments, to enable EDT while keeping UE context, upon receipt of the resume request from upper layers, the UE AS layer continues the resume procedure. However, the UP-EDT is modified to multiplex a NAS-PDU together with the RRCConnectionResumeRequest in Message 3, as described above.

In some embodiments, to avoid loss of user data in CP solutions (both CP-EDT and CP CIoT EPS optimization), when the NAS layer submits the initial NAS PDU containing user data to lower layers (both uplink and downlink directions), a copy of the data part is kept in case retransmissions are needed. If the NAS layer provides the NAS PDU containing user data early, e.g., upon request to resume/establish an RRC connection, if the AS layer cannot deliver the NAS-PDU successfully, an indication to upper layers can be provided so that the copy of data can be kept.

Figure 3:
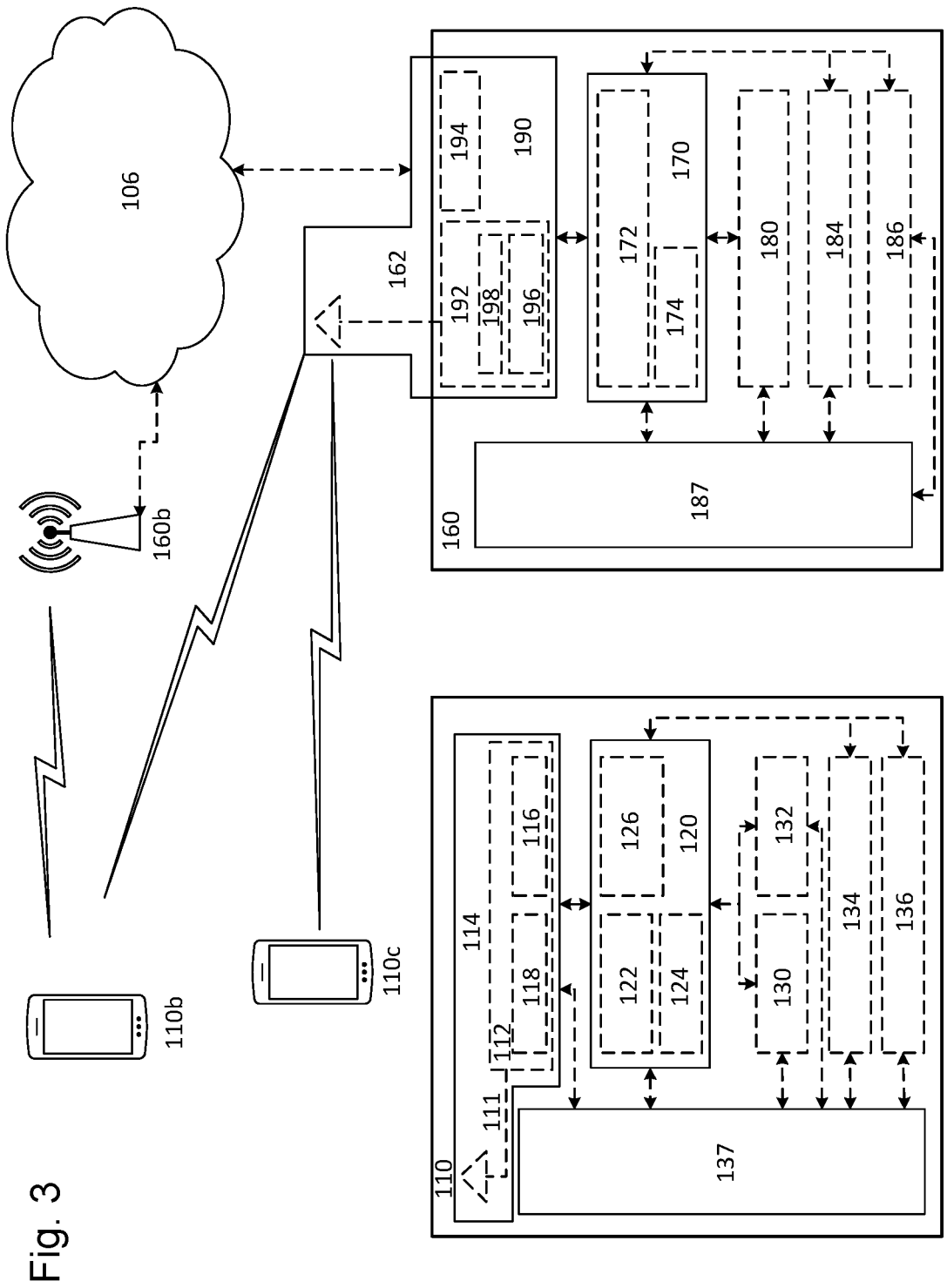
FIG. 3 is a block diagram illustrating an example wireless network.

FIG. 3 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB, gNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 4:
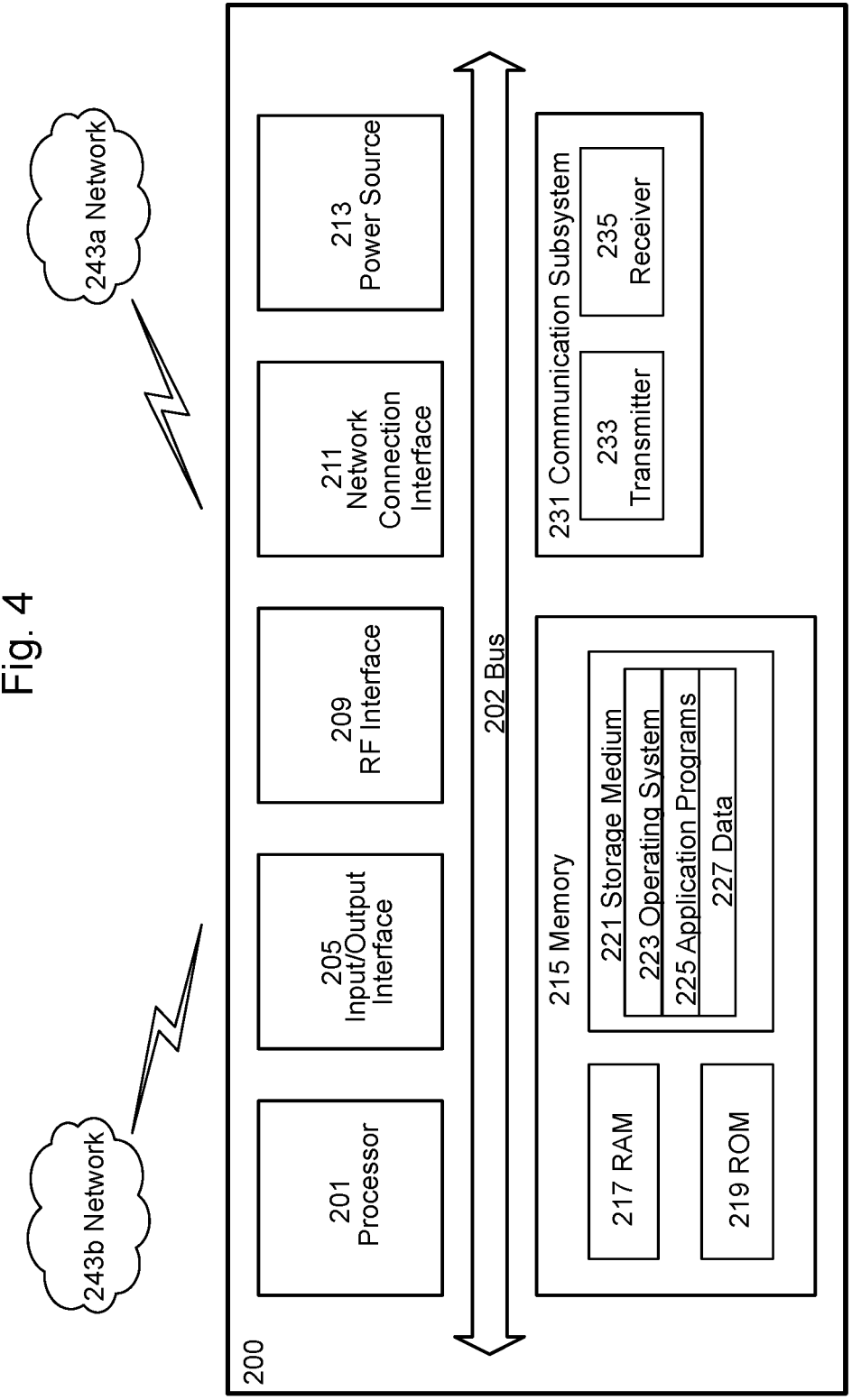
FIG. 4 illustrates an example user equipment, according to certain embodiments.

FIG. 4 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or NR standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
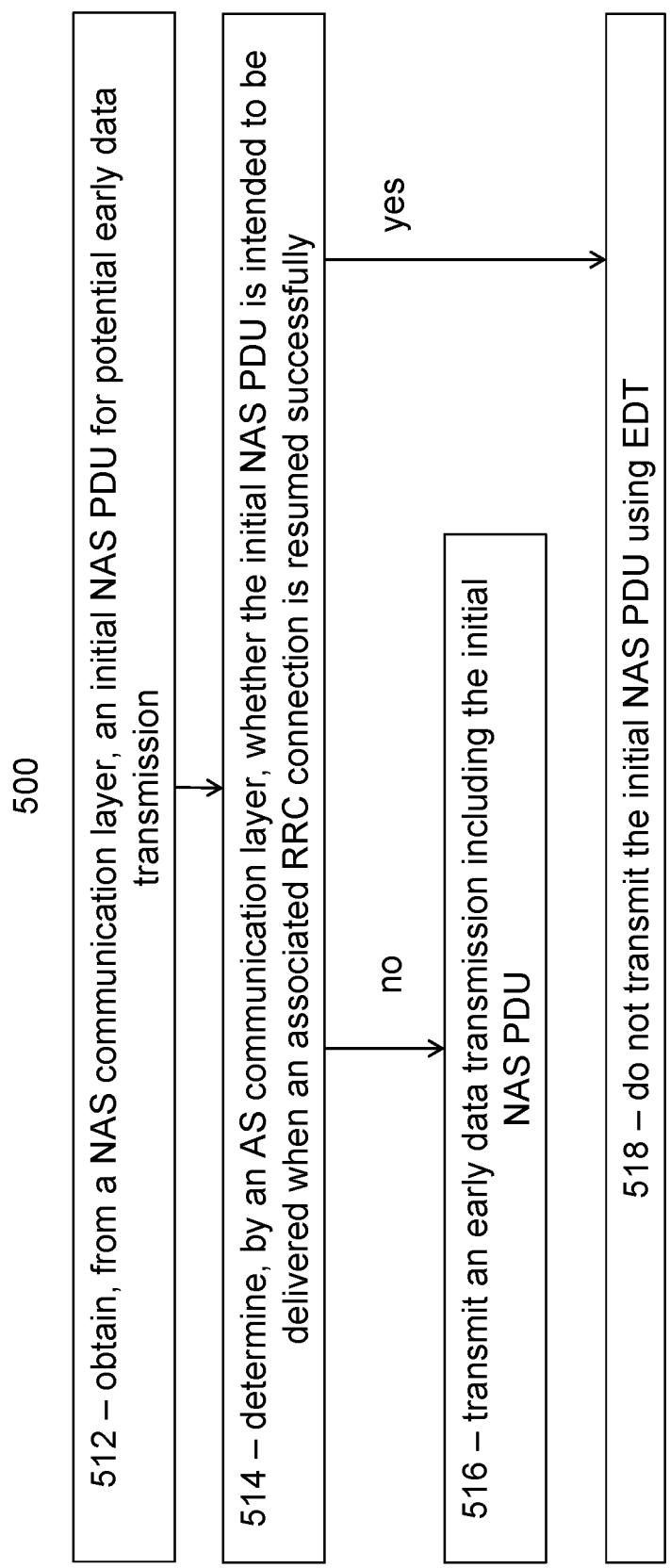
FIG. 5 is flowchart illustrating an example method in a wireless device, according to certain embodiments.

FIG. 5 is a flowchart illustrating an example method in a wireless device, according to certain embodiments. In particular embodiments, one or more steps of FIG. 5 may be performed by wireless device 110 described with respect to FIG. 3.

The method begins at step 512, where the wireless device (e.g., wireless device 110) obtains, from a NAS communication layer, an initial NAS PDU for potential early data transmission.

At step 514, the wireless device determines, by an AS communication layer, whether the initial NAS PDU is intended to be delivered when an associated RRC connection is resumed successfully. In particular embodiments, determining whether the initial NAS PDU is intended to be delivered when the associated RRC connection is resumed successfully comprises obtaining an indication from the NAS communication layer whether the initial NAS PDU is intended to be delivered when the associated RRC connection is resumed successfully and making the determination based on the obtained indication. Obtaining the indication may comprise the AS communication layer requesting the indication from the NAS communication layer or the NAS communication layer sending the indication to the AS communication layer.

At step 516, upon determining that the initial NAS PDU is not intended to be delivered when the associated RRC connection is resumed successfully, the wireless device transmits an early data transmission including the initial NAS PDU.

At step 518, upon determining that the initial NAS PDU is intended to be delivered when the associated RRC connection is resumed successfully, the wireless device does not transmit the initial NAS PDU in an early data transmission. Alternatively, the wireless device may transmit the initial NAS PDU in an early data transmission by multiplexing the initial NAS PDU, user data, and RRC signaling, as described with respect to FIG. 2.

Modifications, additions, or omissions may be made to method 500 of FIG. 5. Additionally, one or more steps in the method of FIG. 5 may be performed in parallel or in any suitable order.

Figure 6:
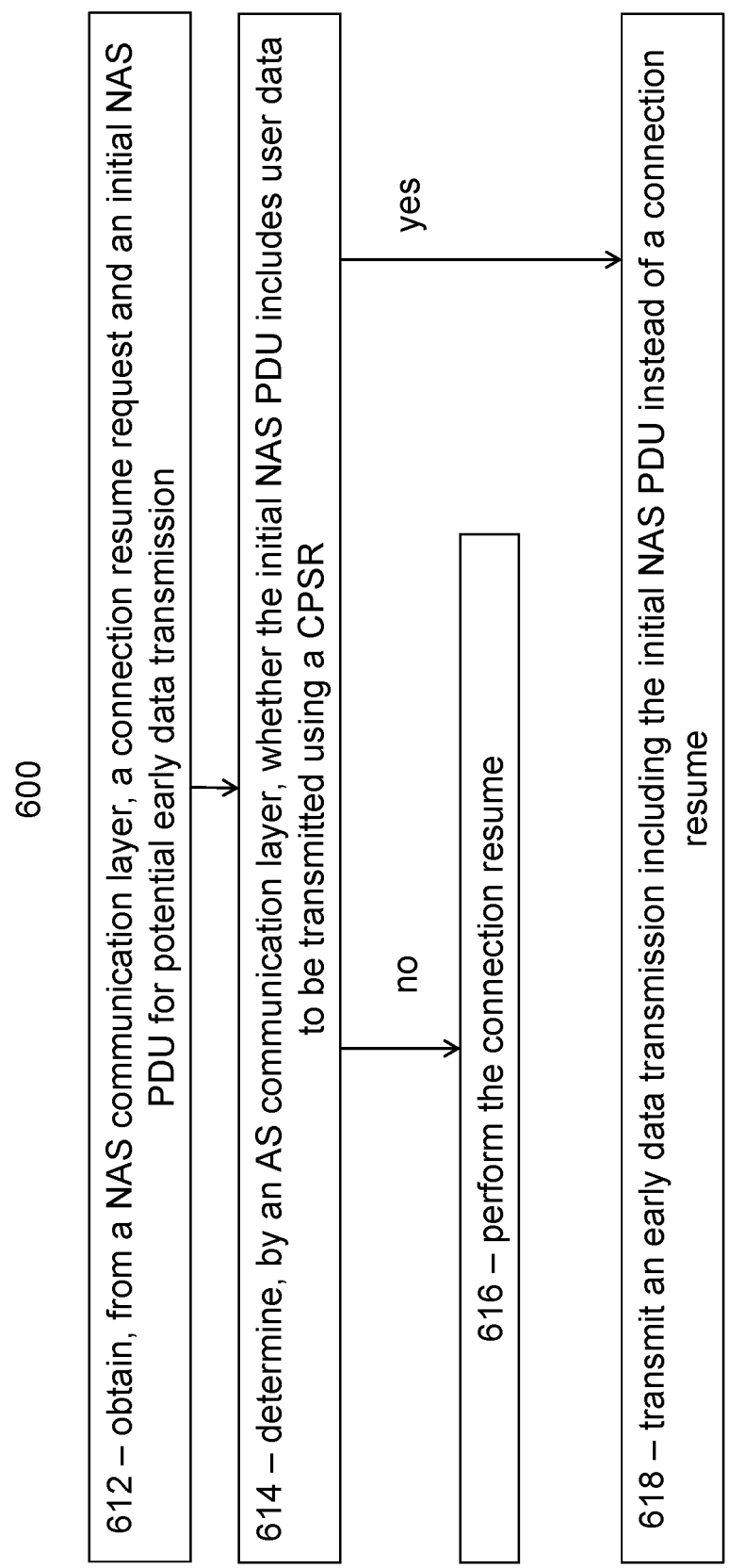
FIG. 6 is a flowchart illustrating another example method in a wireless device, according to certain embodiments.

FIG. 6 is a flowchart illustrating another example method in a wireless device, according to certain embodiments. In particular embodiments, one or more steps of FIG. 6 may be performed by wireless device 110 described with respect to FIG. 3.

The method begins at step 612, where the wireless device (e.g., wireless device 110) obtains, from a NAS communication layer, a connection resume request and an initial NAS PDU for potential early data transmission.

At step 614, the wireless device determines, by an AS communication layer, whether the initial NAS PDU includes user data to be transmitted using a CPSR. In particular embodiments, determining whether the initial NAS PDU includes user data to be transmitted using a CPSR comprises obtaining an indication from the NAS communication layer whether the initial NAS PDU includes user data to be transmitted using a CPSR and making the determination based on the obtained indication. Obtaining the indication may comprise the AS communication layer requesting the indication from the NAS communication layer or the NAS communication layer sending the indication to the AS communication layer.

At step 616, upon determining that the initial NAS PDU does not include user data to be transmitted using a CPSR, the wireless device performs the connection resume.

At step 618, upon determining that the initial NAS PDU includes user data to be transmitted using a CPSR, the wireless device transmits an early data transmission including the initial NAS PDU instead of a connection resume. Alternatively, the wireless device may transmit the initial NAS PDU in an early data transmission multiplexed with a connection resume request, as described with respect to FIG. 2.

Modifications, additions, or omissions may be made to method 600 of FIG. 6. Additionally, one or more steps in the method of FIG. 6 may be performed in parallel or in any suitable order. For example, the example illustrated in FIG. 6 prioritizes the benefits of EDT over connection resume. Other embodiments may prioritize connection resume over EDT. In those embodiments, step 618 may be modified to perform the connection resume instead of performing the EDT.

Figure 7:
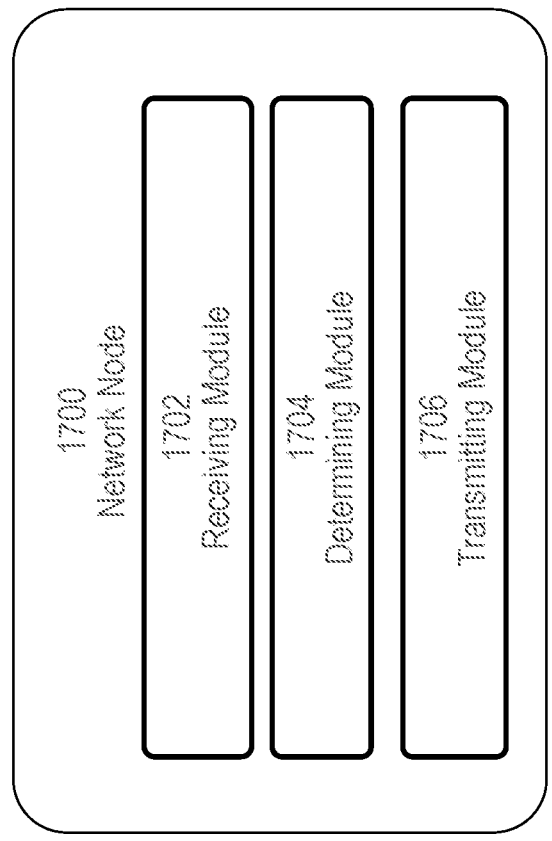
FIG. 7 illustrates a schematic block diagram of a wireless device and network node in a wireless network, according to certain embodiments.
Figure 7:
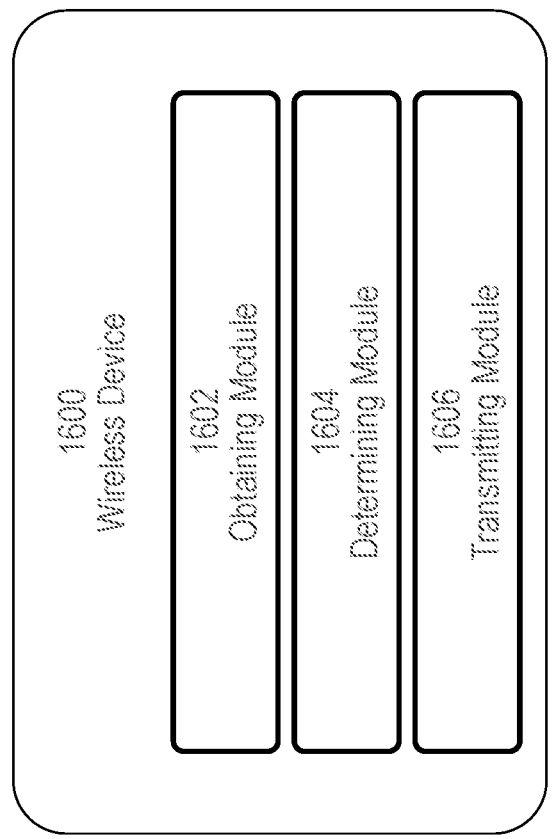

FIG. 7 illustrates a schematic block diagram of two apparatuses in a wireless network (for example, the wireless network illustrated in FIG. 3). The apparatuses include a wireless device and a network node (e.g., wireless device 110 and network node 160 illustrated in FIG. 3). Apparatus 1600 is operable to carry out the example methods described with reference to FIGS. 5 and 6, and possibly any other processes or methods disclosed herein. It is also to be understood that the methods of FIGS. 5 and 6 are not necessarily carried out solely by apparatus 1600. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 7, apparatus 1600 includes obtaining module 1602 configured to obtain NAS PDUs, according to any of the embodiments and examples described herein. Apparatus 1600 also includes determining module 1604 configured to determine whether an initial NAS PDU is intended to be delivered when an associated RRC connection is resumed successfully and/or determine whether an initial NAS PDU includes user data to be transmitted using a CPSR, according to any of the embodiments and examples described herein. Transmitting module 1606 is configured to transmit connection resume requests and/or early data transmissions, according to any of the embodiments and examples described herein.

Figure 8:
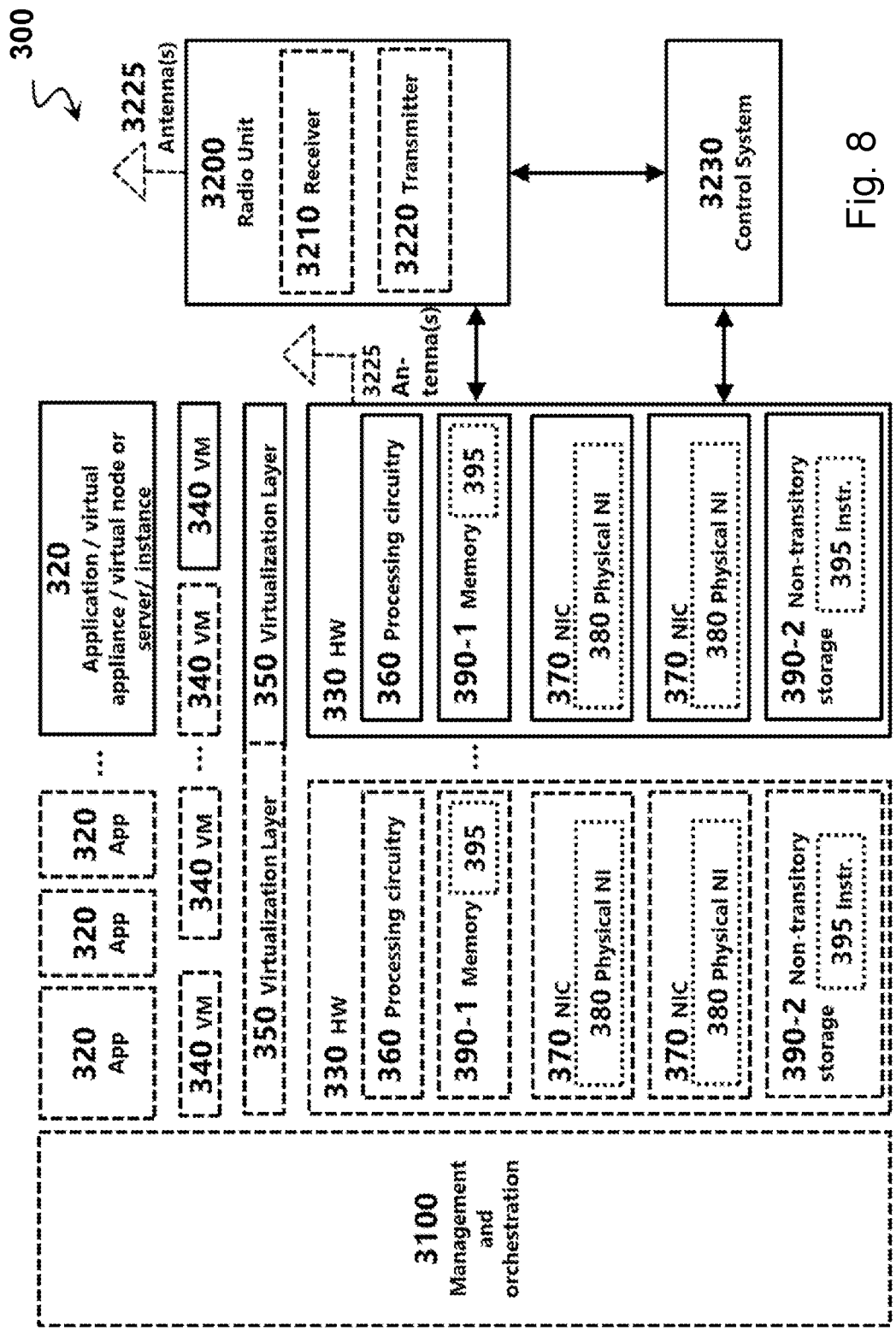
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 9:
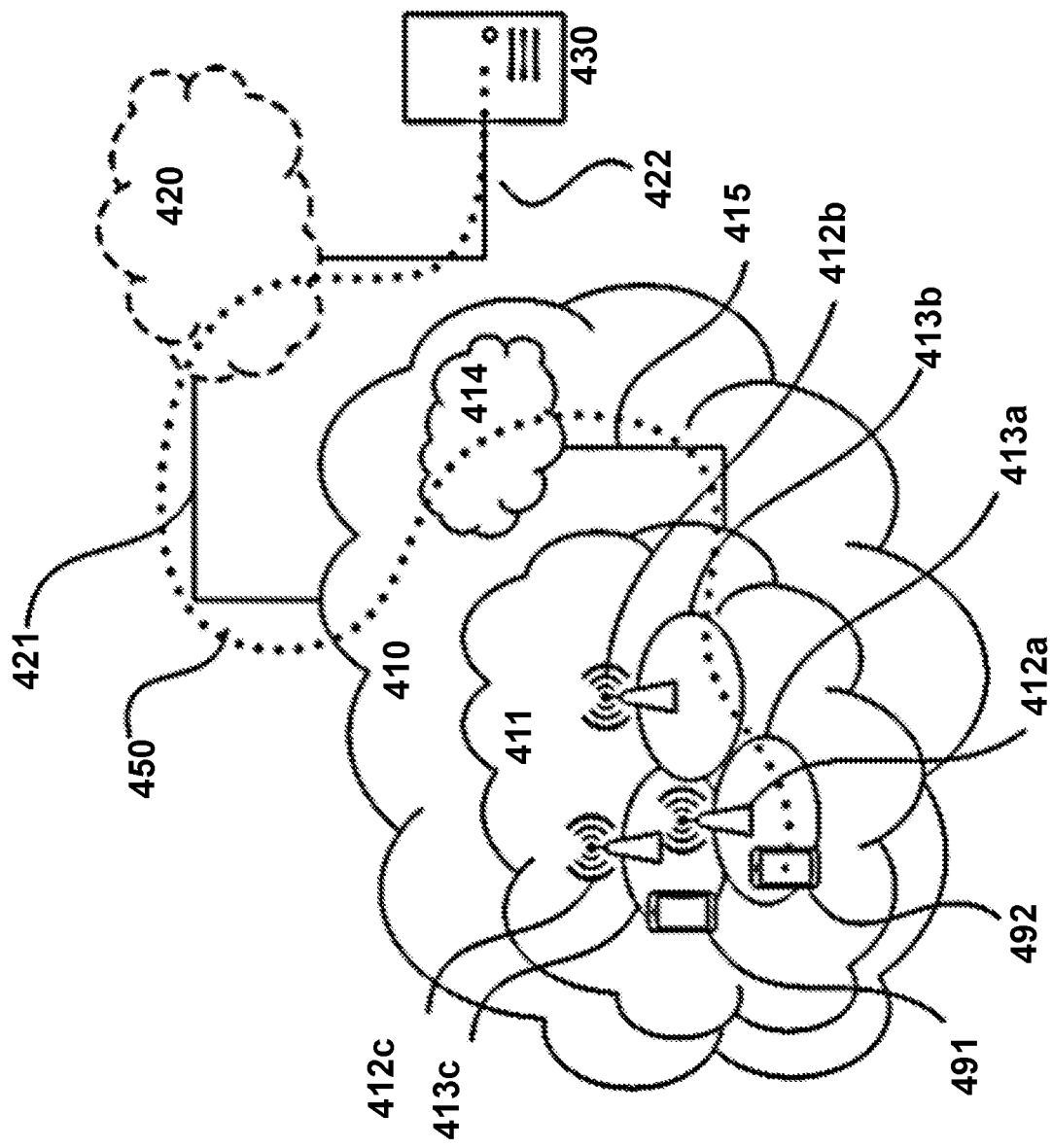
FIG. 9 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415.

A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to a host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
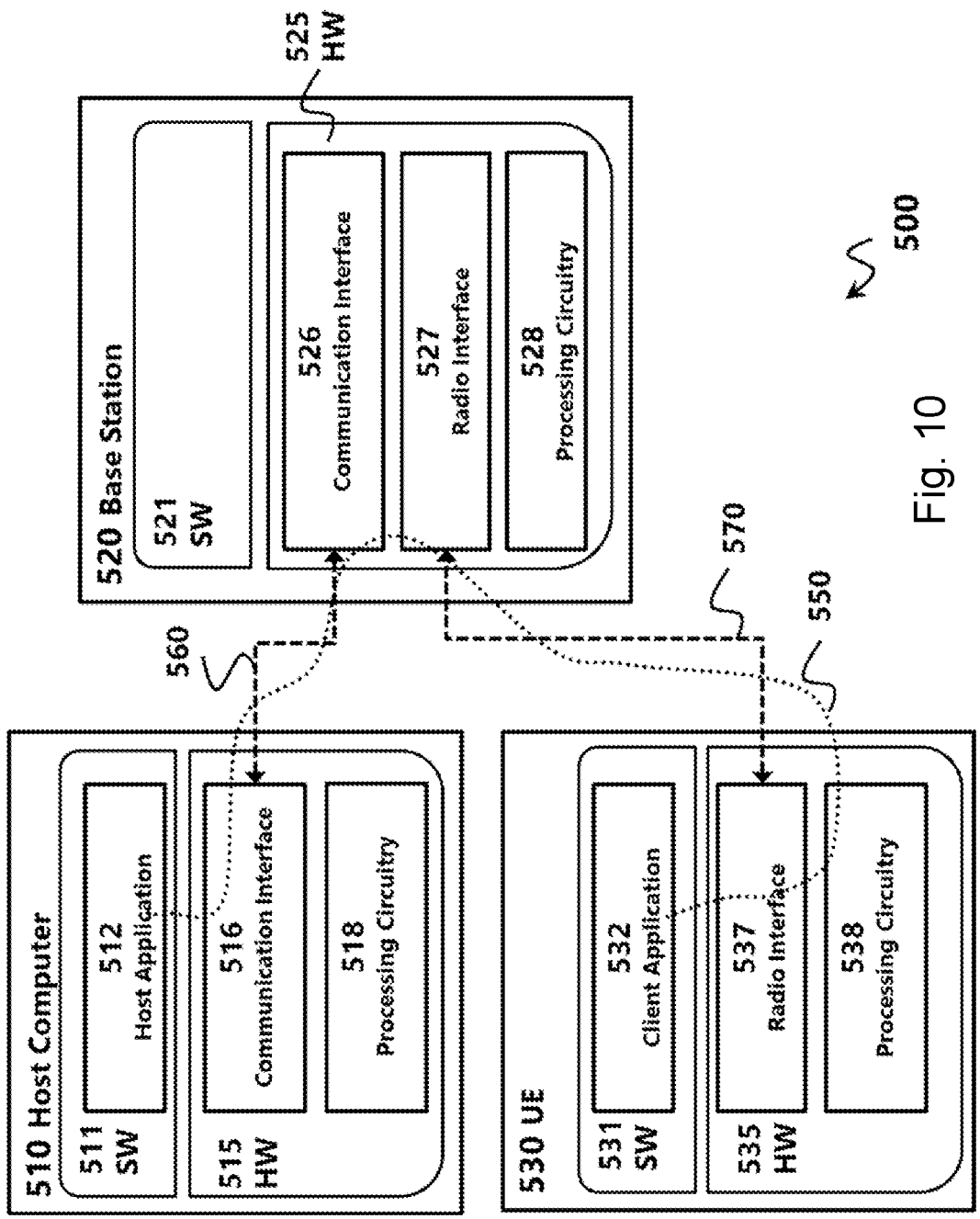
FIG. 10 illustrates an example host computer communicating via a base station with a user equipment over a partially wireless connection, according to certain embodiments.

FIG. 10 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct, or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
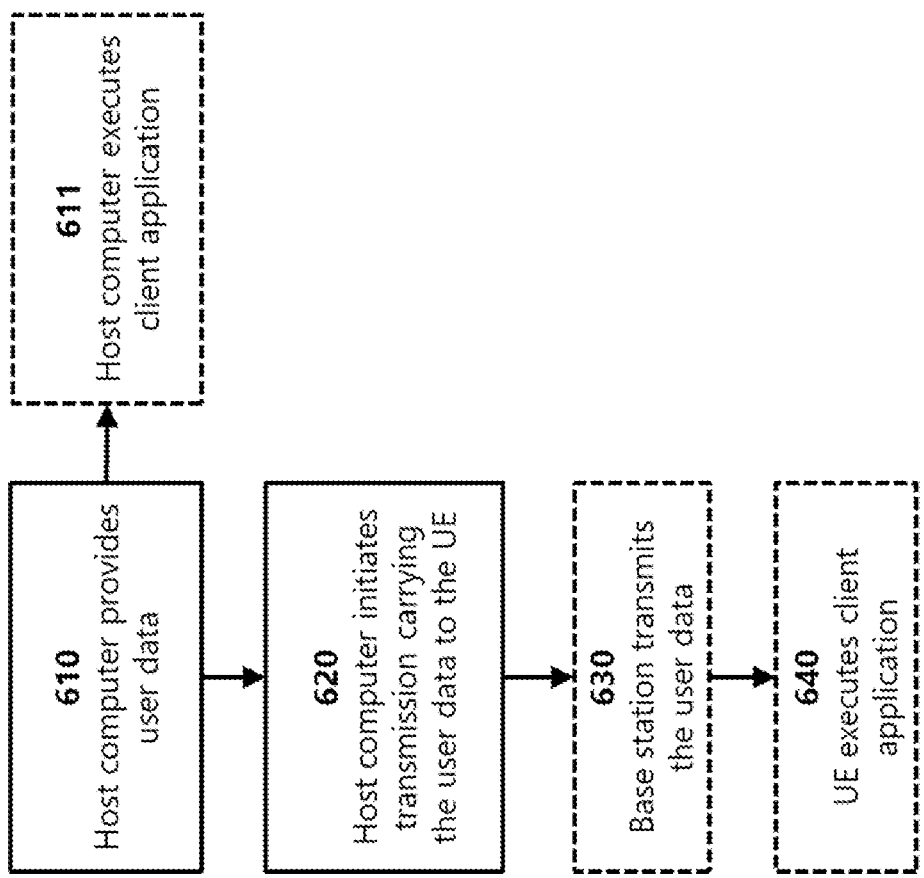
FIG. 11 is a flowchart illustrating a method implemented, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
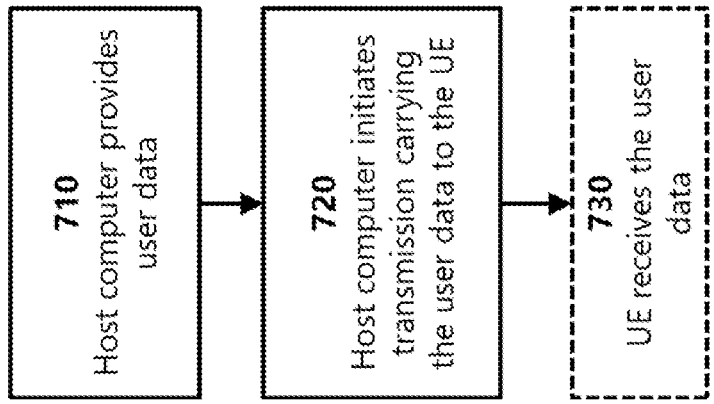
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
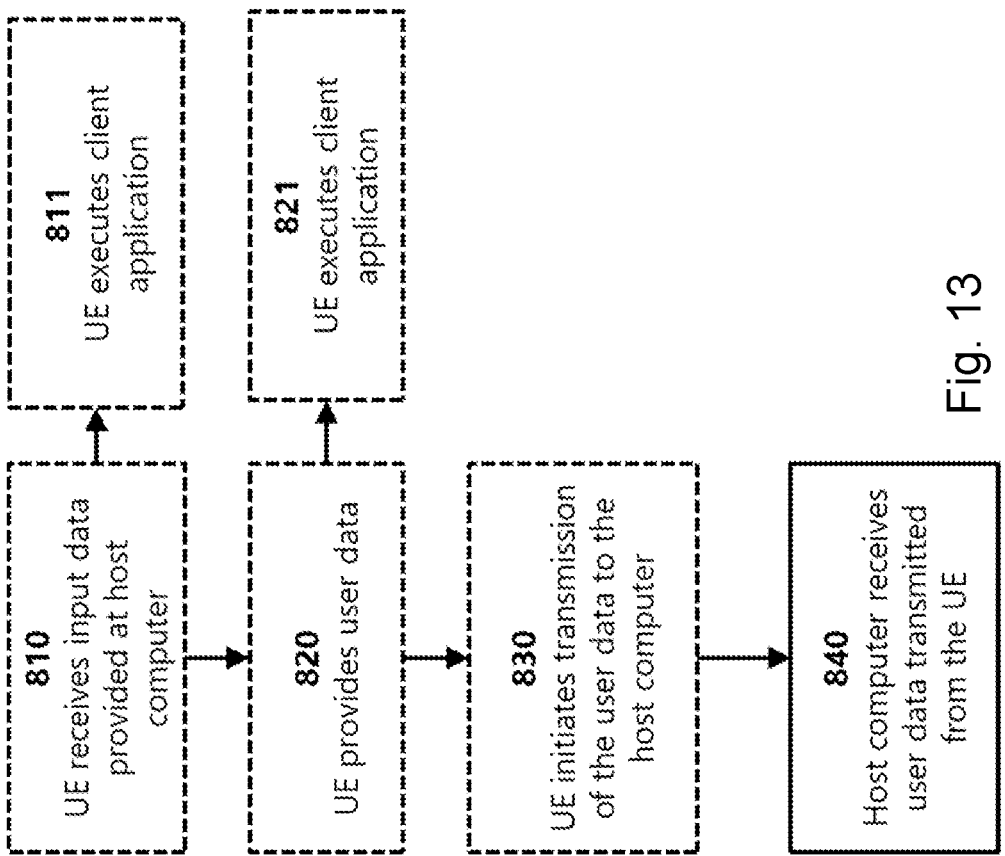
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
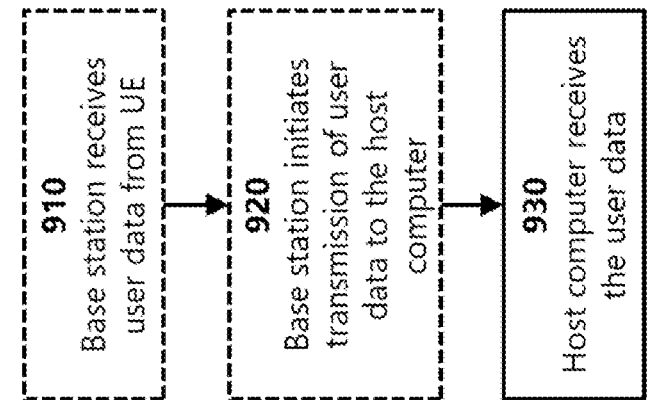
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BI Backoff Indicator
BSR Buffer Status Report
CA Carrier Aggregation
Cat-M1 Category M1
Cat-M2 Category M2
CC Carrier Component
CCCH SDU Common Control Channel SDU
CDMA Code Division Multiplexing Access
CE Coverage Enhanced/Enhancement
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMTC enhanced Machine-Type Communications
eNB Evolved NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IoT Internet of Things
LOS Line of Sight
LPP LTE Positioning Protocol
LTE Long-Term Evolution
M2M Machine-to-Machine
MAC Medium Access Control also Message Authentication Code
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
MTC Machine-Type Communications
NAS Non-Access Stratum
NB-IoT Narrowband Internet of Things
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PDU Protocol Data Unit
PGW Packet Gateway
PHICH Physical Hybrid-ARQ Indicator Channel
PLMN Public Land Mobile Network
PMI Precoder Matrix Indicator
PRACH Physical Random Access Channel (N)PRACH (Narrowband) Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RA Random Access
RAN Radio Access Network
RAPID Random Access Preamble Identifier
RAR Random Access Response
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TBS Transport Block Size
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WI Work Item
WLAN Wide Local Area Network

The invention claimed is:

1. A method performed by a wireless device, the method comprising:
obtaining, from a non-access stratum (NAS) communication layer, an initial NAS protocol data unit (PDU) for potential early data transmission;
determining, by an access-stratum (AS) communication layer, whether the initial NAS PDU is intended to be delivered when an associated radio resource control (RRC) connection is resumed successfully;
upon determining that the initial NAS PDU is not intended to be delivered when the associated RRC connection is resumed successfully, transmitting an early data transmission including the initial NAS PDU;
when the NAS communication layer submits the initial NAS PDU containing user data to lower layers, a copy of the user data is kept in case retransmissions are needed; and
if the NAS communication layer provides the NAS PDU containing the user data upon request to resume or establish an RRC connection, and if the AS communication layer cannot deliver the NAS-PDU successfully, an indication to upper layers is provided so that the copy of the user data can be kept.

2. The method of claim 1, further comprising upon determining that the initial NAS PDU is intended to be delivered when the associated RRC connection is resumed successfully, not transmitting the initial NAS PDU in an early data transmission.

3. The method of claim 1, wherein determining whether the initial NAS PDU is intended to be delivered when the associated RRC connection is resumed successfully comprises obtaining an indication from the NAS communication layer whether the initial NAS PDU is intended to be delivered when the associated RRC connection is resumed successfully and making the determination based on the obtained indication.

4. The method of claim 3, wherein obtaining the indication comprises the AS communication layer requesting the indication from the NAS communication layer.

5. The method of claim 3, wherein obtaining the indication comprises the NAS communication layer sending the indication to the AS communication layer.

6. The method of claim 1, further comprising upon determining that the initial NAS PDU is intended to be delivered when the associated RRC connection is resumed successfully, transmitting the initial NAS PDU in an early data transmission by multiplexing the initial NAS PDU, user data, and RRC signaling.

7. A wireless device comprising processing circuitry operable to:
obtain, from a non-access stratum (NAS) communication layer, an initial NAS protocol data unit (PDU) for potential early data transmission;
determine, by an access-stratum (AS) communication layer, whether the initial NAS PDU is intended to be delivered when an associated radio resource control (RRC) connection is resumed successfully;
upon determining that the initial NAS PDU is not intended to be delivered when the associated RRC connection is resumed successfully, transmit an early data transmission including the initial NAS PDU;
when the NAS communication layer submits the initial NAS PDU containing user data to lower layers, a copy of the user data is kept in case retransmissions are needed; and
if the NAS communication layer provides the NAS PDU containing the user data upon request to resume or establish an RRC connection, and if the AS communication layer cannot deliver the NAS-PDU successfully, an indication to upper layers is provided so that the copy of the user data can be kept.

8. The wireless device of claim 7, the processing circuitry further operable to, upon determining that the initial NAS PDU is intended to be delivered when the associated RRC connection is resumed successfully, not transmit the initial NAS PDU in an early data transmission.

9. The wireless device of claim 7, wherein the processing circuitry is operable to determine whether the initial NAS PDU is intended to be delivered when the associated RRC connection is resumed successfully by obtaining an indication from the NAS communication layer whether the initial NAS PDU is intended to be delivered when the associated RRC connection is resumed successfully and making the determination based on the obtained indication.

10. The wireless device of claim 7, the processing circuitry further operable to, upon determining that the initial NAS PDU is intended to be delivered when the associated RRC connection is resumed successfully, transmit the initial NAS PDU in an early data transmission by multiplexing the initial NAS PDU, user data, and RRC signaling.

11. A method performed by a wireless device, the method comprising:
   obtaining, from a non-access stratum (NAS) communication layer, a connection resume request and an initial NAS protocol data unit (PDU) for potential early data transmission;
   determining, by an access-stratum (AS) communication layer, whether the initial NAS PDU includes user data to be transmitted using a control plane service request (CPSR);
   upon determining that the initial NAS PDU includes user data to be transmitted using a CPSR, transmitting an early data transmission including the initial NAS PDU instead of a connection resume;
   when the NAS communication layer submits the initial NAS PDU containing user data to lower layers, a copy of the user data is kept in case retransmissions are needed; and
   if the NAS communication layer provides the NAS PDU containing the user data upon request to resume or establish an RRC connection, and if the AS communication layer cannot deliver the NAS-PDU successfully, an indication to upper layers is provided so that the copy of the user data can be kept.

12. The method of claim 11, further comprising upon determining that the initial NAS PDU does not include user data to be transmitted using a CPSR, performing the connection resume.

13. The method of claim 11, wherein determining whether the initial NAS PDU includes user data to be transmitted using a CPSR comprises obtaining an indication from the NAS communication layer whether the initial NAS PDU includes user data to be transmitted using a CPSR and making the determination based on the obtained indication.

14. The method of claim 13, wherein obtaining the indication comprises the AS communication layer requesting the indication from the NAS communication layer.

15. The method of claim 13, wherein obtaining the indication comprises the NAS communication layer sending the indication to the AS communication layer.

16. The method of claim 11, further comprising upon determining that the initial NAS PDU includes user data to be transmitted using a CPSR, transmitting the initial NAS PDU in an early data transmission multiplexed with a connection resume request.

17. A wireless device comprising processing circuitry operable to:
   obtain, from a non-access stratum (NAS) communication layer, a connection resume request and an initial NAS protocol data unit (PDU) for potential early data transmission;
   determine, by an access-stratum (AS) communication layer, whether the initial NAS PDU includes user data to be transmitted using a control plane service request (CPSR);
   upon determining that the initial NAS PDU includes user data to be transmitted using a CPSR, transmit an early data transmission including the initial NAS PDU instead of a connection resume;
   when the NAS communication layer submits the initial NAS PDU containing user data to lower layers, a copy of the user data is kept in case retransmissions are needed; and
   if the NAS communication layer provides the NAS PDU containing the user data upon request to resume or establish an RRC connection, and if the AS communication layer cannot deliver the NAS-PDU successfully, an indication to upper layers is provided so that the copy of the user data can be kept.

18. The wireless device of claim 17, the processing circuitry further operable to, upon determining that the initial NAS PDU does not include user data to be transmitted using a CPSR, perform the connection resume.

19. The wireless device of claim 17, wherein the processing circuitry is operable to determine whether the initial NAS PDU includes user data to be transmitted using a CPSR by obtaining an indication from the NAS communication layer whether the initial NAS PDU includes user data to be transmitted using a CPSR and making the determination based on the obtained indication.

20. The wireless device of claim 17, the processing circuitry further operable to, upon determining that the initial NAS PDU includes user data to be transmitted using a CPSR, transmitting the initial NAS PDU in an early data transmission multiplexed with a connection resume request.

* * * * *